United States Patent Office 2,720,114
Patented Oct. 11, 1955

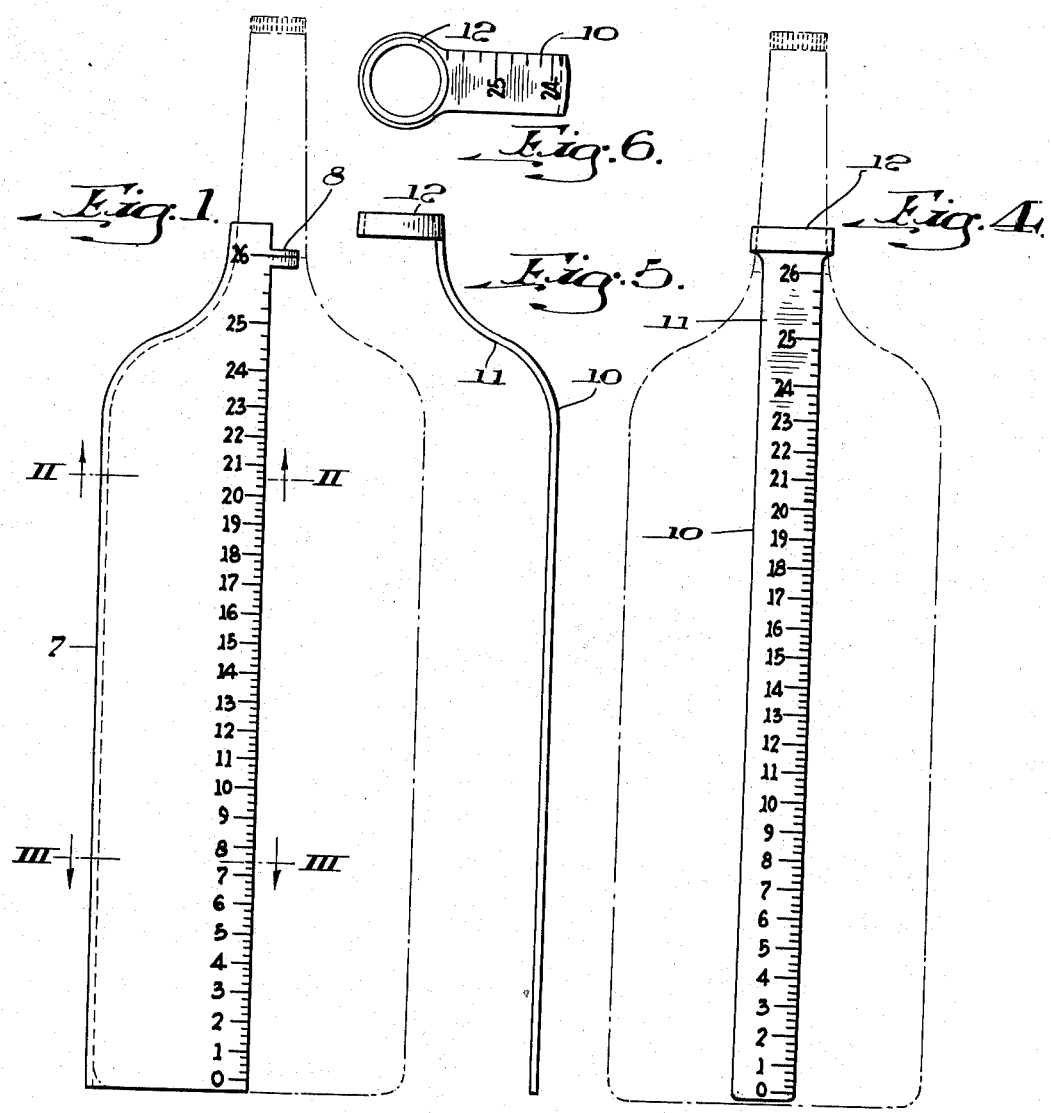

2,720,114

MEASURING GAGE FOR BEVERAGE BOTTLES

John P. Truffa, Hyde Park, Pa.

Application March 25, 1954, Serial No. 418,658

2 Claims. (Cl. 73—428)

My invention relates to gages for measuring the contents of beverage bottles, the device being of particular utility in connection with indicating quantities that are dispensed from wine and liquor bottles, etc.

One object of my invention is to provide a device of the character referred to which can readily be placed against a liquor bottle and has a scale thereon indicating ounces and fractions of ounces at various levels.

Another object of my invention is to provide a gage of this type that can have hooked engagement with the neck of a bottle and will thereby be caused to remain in close engagement with the bottle throughout its length.

Some of the forms which my invention may take are shown in the accompanying drawing, wherein Figure 1 is a side view of a gage;

Figs. 2 and 3 are views taken on the line II—II and III—III respectively, of Fig. 1;

Fig. 4 is a face view of another form of gage;

Fig. 5 is an edge view thereof, and

Fig. 6 is a plan view of Fig. 4.

Referring first to Figs. 1 to 3, the gage member 7 is of partly cylindrical form throughout the major portion of its length and may be of any suitable material such as glass, plastic, cardboard, etc. Scale marks are provided along one edge of the gage, to indicate ounces and fractions of ounces. Near its upper end, the member is of gradually reduced radius to provide a shoulder that will rest upon the shoulder of a bottle. Collar-like or clip-like extensions 8 are provided to partly embrace the neck of a bottle as shown in Fig. 1. If the material of the gage is flexible, the collar can be engaged with a bottle neck simply by a snap action through pushing the member sidewise against the bottle. In case the collar-like clips 8 are of rigid material, or in case the collar member is in the form of a continuous circle as in Fig. 6, the gage member can be applied by sliding it vertically downward on a bottle into its seated position.

Also, particularly if the gage member is made of material that is fairly stiff and of considerable weight such as glass or thick-walled plastic, the holding collar may be dispensed with and the gage simply set on a shelf along with the bottle.

Referring now to Figs. 4, 5 and 6, I show a gage member 10 that is in the form of a bar or strip of fairly stiff material such as metal, cardboard or plastic. This strip has a shouldered portion 11 as in the case of the gage of Fig. 1 and has a collar 12 formed on its upper end in position to be slid downwardly on a bottle neck.

The gages will be particularly useful in saloons, so that the proprietor may check on sales of liquor from various bottles from time to time. Advertising can also be printed on the gages. They can remain in place while the liquid is being poured, since the clips will hold their upper ends against the neck of the bottle, and the lower end will be held against the bottle by the thumb or fingers of the person grasping the bottle.

I claim as my invention:

1. A gage for measuring the contents of beverage bottles, comprising a member having gradation marks thereon that are disposed along a vertical line adjacent to one vertical edge of the member, the said member being of partially cylindrical form and tapering inwardly at its upper end to embrace a bottle and its neck, whereby it will have stability when resting on a shelf in an upright position against a bottle that is on the shelf.

2. A gage for measuring the contents of beverage bottles, comprising a member having gradation marks thereon that are disposed along a vertical line adjacent to one vertical edge of the member, the said member being of partially cylindrical form and tapering inwardly at its upper end to embrace a bottle and its neck, whereby it will have stability when resting on a shelf in an upright position against a bottle that is on the shelf, and a neck-engaging clip on said tapered end.

References Cited in the file of this patent

UNITED STATES PATENTS

| 645,875 | Strauss | Mar. 20, 1900 |
| 1,515,398 | Marcussen | Nov. 11, 1924 |
| 2,507,684 | Smith | May 16, 1930 |

FOREIGN PATENTS

| 234,612 | Great Britain | June 4, 1925 |